US011436048B2

United States Patent
Tan et al.

(10) Patent No.: US 11,436,048 B2
(45) Date of Patent: Sep. 6, 2022

(54) METHOD OF MANAGING TASK DEPENDENCIES AT RUNTIME IN A PARALLEL COMPUTING SYSTEM OF A HARDWARE PROCESSING SYSTEM AND A HARDWARE ACCELERATION PROCESSOR

(71) Applicants: Barcelona Supercomputing Center, Barcelona (ES); Universitat Politecnica De Catalunya, Barcelona (ES)

(72) Inventors: Xubin Tan, Barcelona (ES); Carlos Alvarez Martinez, Barcelona (ES); Jaume Bosch Pons, Barcelona (ES); Daniel Jimenez Gonzalez, Barcelona (ES); Mateo Valero Cortes, Barcelona (ES)

(73) Assignees: Barcelona Supercomputing Center—Centro Nacional De Supercomputacion, Barcelona (ES); Universitat Politecnica De Catalunya, Barcelona (ES)

(*) Notice: Subject to any disclaimer, the term of this patent is extended or adjusted under 35 U.S.C. 154(b) by 134 days.

(21) Appl. No.: 16/618,149

(22) PCT Filed: Jul. 24, 2017

(86) PCT No.: PCT/EP2017/068695
§ 371 (c)(1),
(2) Date: Nov. 28, 2019

(87) PCT Pub. No.: WO2018/219480
PCT Pub. Date: Dec. 6, 2018

(65) Prior Publication Data
US 2020/0110634 A1    Apr. 9, 2020

(30) Foreign Application Priority Data
May 29, 2017 (EP) .................................. 17382307

(51) Int. Cl.
G06F 9/48 (2006.01)
G06F 9/30 (2018.01)
(Continued)

(52) U.S. Cl.
CPC .......... G06F 9/4881 (2013.01); G06F 9/3009 (2013.01); G06F 9/30047 (2013.01);
(Continued)

(58) Field of Classification Search
None
See application file for complete search history.

(56) References Cited

U.S. PATENT DOCUMENTS 7,203,775 B2 * 4/2007 Van Doren ............. G06F 9/524
  710/52
8,320,392 B1 * 11/2012 Wang .................. H04L 49/9005
  370/413
(Continued)

FOREIGN PATENT DOCUMENTS

WO   20100004474 A2   1/2010

OTHER PUBLICATIONS

Engelhardt et al., "An Integrated Hardware-Software Approach to Task Graph Management," 2014 IEEE Intl Conf on High Performance Computing and Communications, 2014 IEEE 6th Intl Symp on Cyberspace Safety and Security, 2014 IEEE 11th Intl Conf on Embedded Software and (Year: 2014).*
(Continued)

*Primary Examiner* — Abu Zar Ghaffari
(74) *Attorney, Agent, or Firm* — Thedford I. Hitaffer; Hitaffer & Hitaffer, PLLC

(57) ABSTRACT

Hardware acceleration of task dependency management in parallel computing, wherein solutions are proposed for hardware-based dependency management to support nested tasks, resolve system deadlocks as a result of memory full
(Continued)

conditions in the dedicated hardware memory and synergetic operation of software runtime and hardware acceleration to solve otherwise unsolvable deadlocks when nested tasks are processed. Buffered asynchronous communication of larger data exchange are introduced, requiring less support from multi-core processor elements as opposed to standard access through the multi-core processor elements. A hardware acceleration processor may be implemented in the same silicon die as the multi-core processor for achieving gains in performance, fabrication cost reduction and energy consumption saving during operation.

13 Claims, 10 Drawing Sheets

(51) Int. Cl.
*G06F 9/50* (2006.01)
*G06F 9/52* (2006.01)
*G06F 9/54* (2006.01)
*G06F 9/4401* (2018.01)

(52) U.S. Cl.
CPC .......... *G06F 9/4405* (2013.01); *G06F 9/5016* (2013.01); *G06F 9/5027* (2013.01); *G06F 9/524* (2013.01); *G06F 9/544* (2013.01); *G06F 9/546* (2013.01); *G06F 2209/503* (2013.01); *G06F 2209/5011* (2013.01); *G06F 2209/5018* (2013.01)

(56) References Cited

U.S. PATENT DOCUMENTS

| | | | | |
|---|---|---|---|---|
| 8,387,066 | B1* | 2/2013 | Becher | G06F 9/4881 |
| | | | | 718/106 |
| 9,058,678 | B1* | 6/2015 | Le Grand | G06T 17/00 |
| 2008/0294871 | A1* | 11/2008 | Pappalardo | G06F 9/3887 |
| | | | | 712/22 |
| 2009/0254774 | A1* | 10/2009 | Chamdani | G06F 16/2455 |
| | | | | 714/2 |
| 2011/0093854 | A1* | 4/2011 | Blanc | G06F 9/5066 |
| | | | | 718/101 |
| 2011/0099335 | A1* | 4/2011 | Scott | G06F 12/0842 |
| | | | | 711/E12.017 |
| 2011/0296528 | A1* | 12/2011 | Shukla | G06F 11/3664 |
| | | | | 726/25 |
| 2013/0305258 | A1 | 11/2013 | Durant | |
| 2015/0268992 | A1* | 9/2015 | Fan | G06F 9/4881 |
| | | | | 718/106 |
| 2015/0378899 | A1* | 12/2015 | Busaba | G06F 12/0808 |
| | | | | 711/130 |
| 2016/0163016 | A1 | 6/2016 | Gould | |
| 2016/0196162 | A1 | 7/2016 | Raman et al. | |
| 2016/0217016 | A1 | 7/2016 | Raman et al. | |
| 2018/0188997 | A1* | 7/2018 | Fleming, Jr. | G06F 9/3838 |
| 2018/0293102 | A1* | 10/2018 | Ray | G06F 9/4881 |

OTHER PUBLICATIONS

WIPO, International Search Report, dated Feb. 1, 2018, in International Application No. PCT/EP2017/068695, filed Jul. 24, 2017.
WIPO, Written Opinion, dated Feb. 1, 2018, in International Application No. PCT/EP2017/068695, filed Jul. 24, 2017.

* cited by examiner

METHOD OF MANAGING TASK DEPENDENCIES AT RUNTIME IN A PARALLEL COMPUTING SYSTEM OF A HARDWARE PROCESSING SYSTEM AND A HARDWARE ACCELERATION PROCESSOR

CROSS-REFERENCE TO RELATED APPLICATIONS

This application, filed under 35 USC 371, is a United States National Stage Application of International Application No. PCT/EP2017/068695, filed Jul. 24, 2017, which claims priority to EP Application No. 17382307.1, filed on May 29, 2017, the disclosures of which are incorporated herein by reference in their entirety.

TECHNICAL FIELD

The present disclosure relates to techniques and devices for managing task dependency and more specifically to hardware acceleration of nested-task dependency management in multi-core parallel computing systems and collaborative use of hardware and software to resolve systems deadlocks.

This application claims the benefit of European Patent Application EP17382307 filed 29 May, 2017.

BACKGROUND

Parallel computing has become a ubiquitous principle for gaining performance and lowering energy consumption on multi-core and many-core platforms. Meanwhile, it exposes significant challenges, such as detecting parallel regions, distributing tasks/works evenly and synchronizing them. Task-based dataflow programming models are quickly evolving to target these challenges. Among these models, OpenMP, Intel's TBB, StarSs and OmpSs are the most well-known. Using task-based dataflow programming models, an application can be expressed as a collection of tasks with dependencies, which are managed at runtime. Runtime management can better exploit hardware resources as opposed to compiler time management. With moderate task sizes, these programming models are able to exploit high levels of task parallelization. However, with fine grained tasks runtime management models suffer different degrees of performance degradation due to runtime overheads involved in breaking work into a large number or interdependent tasks and switching context according to the executed tasks.

A straight forward way to overcome this deficiency and enable a finer task parallelization is to improve the runtime by offloading some the most time consuming runtime functions to hardware. In fact software runtime overhead mainly consists of task creation, dependency analysis and task scheduling.

Among those, task dependence analysis is the most time consuming function. Emphasis is put on accelerating this part in hardware. By eliminating task dependence analysis from the main/worker threads, they have more resources available to accomplish other important tasks.

Various programming models are used in prior art to annotate sequential programs with directives to exploit heterogeneity and task parallelism. For instance one can specify a task with the direction of its data dependencies. Implicit synchronization between tasks is automatically managed by dependence analysis, while synchronization management makes a thread wait until all its child tasks finish before it can resume the code execution. When a compiler finds a task annotation in the program it outlines the next statement and introduces a time system call to create to create a task. At execution time, the runtime system manages task creation, computes task dependence graph and schedules tasks when they can be executed because their dependencies are ready.

In the OpenMP standard, nested tasks are defined as tasks that have been created by other tasks, with or without dependencies. Nested tasks are usually supported to improve the programmability of parallel programs. For instance a nested task can be found in recursive code where the recursive function is a task, in codes where the main task is so big that it can be decomposed (e.g. in video coding), or even when using tasks to call libraries that have already been programmed with tasks. Therefore, nested task support is a necessary feature of any task manager that executes general-purpose codes.

The OpenMP standard defines two limitations for nested tasks, which are necessary to consider:

A child task can only have a subset of the dependencies of its parent task;

The dependencies of a child task only affect its sibling tasks, i.e. child tasks of the same parent.

The support for nested tasks is implemented in virtually all software-based task dependency software managers. It is rather easy to support and the system takes care of handling memory requirements without problems from full memory as it uses the system memory, which is of the order of at least several hundred megabytes, and can be regarded as never full for storing task dependencies. This solution is also easy to implement allowing the user easy programming without having to worry of memory handling.

The same solution has not been found in prior art for hardware task dependency management. In this case it is the programmer who has to take care of the physical handling of the dedicated and limited physical memory where task dependency data and scheduling data are stored. In these cases it is frequent for the dedicated memory to become full or get into critical memory conflicts (situations where a data cannot be stored into an already full memory entry because no memory replacement is possible). In the case of non-nested task, this is easy to handle as no new tasks are treated until memory space becomes available. However, when nested tasks exist, parent task dependencies may expand considerably during its management as the dependencies of all its child tasks will also need to be stored.

Prior art in hardware support for hardware dependency management, has showed great scalability and performance gains over pure software based task dependency management. However prior art does not support nested tasks, neither have they been evaluated in a real system integrated as a hardware support within a dynamic task-based dataflow programming model runtime.

SUMMARY OF THE INVENTION

The current disclosure teaches a solution to the problem of efficient handling of nested task dependency management at runtime using hardware support and of efficient handling of problems occurring as a result of full memory/critical memory conflict in the dedicated memory of the hardware accelerator.

It also presents a solution to the problem of efficient solving deadlock conditions when handling nested tasks and in particular the cooperative use of hardware and software-based runtime task dependency management. Such conditions are also solved using a modified hardware setup where dedicated local memory is used at the hardware accelerator together with a mechanism for detecting conditions of full memory or critical memory conflicts, stopping the reception of new tasks and flushing and reconstructing the local memory if needed for the remaining tasks. This operation is supported by extended flags and parameters to identify the parents of nested task and identify free memory spaces and valid task identification numbers.

In addition it offers a solution to accessing system memory, where the standard process involves memory access through the multi-core processor. Regarding this problem the current invention goes a step forward to Direct Memory Access (DMA) which is faster than normal memory access but is still not very efficient since small data exchange between system components degrade performance. In order to efficiently perform those memory accesses, the current invention introduces buffered and asynchronous communication.

In a first aspect, a method is proposed of managing task dependencies at runtime in a parallel computing system of a hardware processing system. The parallel computing system may comprise a multi-core processor running runtime software, a hardware acceleration processor, a communication module, and a gateway. The method may comprise: initializing the parallel computing system; allocating data buffers in system memory for each thread running in each multi-core processing element; sending system memory address and length of buffers used in a communication to the hardware acceleration processor, using buffered and asynchronous communication; the hardware acceleration processor directly accessing the buffers bypassing the threads running in the parallel processing elements; the hardware acceleration processor reading a new task buffer and upon sensing a memory full condition or critical memory conflict in a dedicated local memory attached to the hardware acceleration processor, instructing the gateway to stop received new tasks; the hardware acceleration processor continues processing the dependencies of the last read task; and having finished dependency processing of the last read task, memory space is freed and processing continues with a next task.

In some examples, when the tasks are nested tasks, the method may further comprise: if first child task dependencies have been processed, the runtime software allowing the hardware acceleration processor to continue processing task dependencies; if first child task dependencies have not been processed, waiting until a threshold time is reached or checking new task buffer status before instructing the thread to lock the new task buffer and remove all its child tasks; the runtime software reconstructing the new task buffer by updating all corresponding pointers if it has any remaining tasks that have been created by other tasks; the hardware acceleration processor checking the state of the first child task; the thread executing tasks in order or submitting them as a whole with their child dependencies to a software task dependency graph manager; the runtime software reverting to the hardware acceleration processor for task and dependency management when the memory full or the critical memory conflict signal is cleared; and the thread executing tasks in order or submitting them as a whole with their child dependencies to a software task dependency graph manager.

When the system comprises a set of processors and a set of accelerators, submitting tasks in order directly to the accelerators can be troublesome. When the gateway module is stopped due to a full signal, a system where the accelerators are directly connected to the hardware task dependency manager may deadlock as there may be no available connection to the accelerators. To solve this issue, different methods may be used. For example, if the accelerators are connected only to the hardware task manager, it may include a bypass to directly submit ready tasks to the accelerators even when the system is full. Alternatively or additionally, a simple accelerator hardware manager working in parallel with the hardware task manager may be implemented and used as a bypass. Even a software accelerator manager configured to send tasks directly to the accelerators may be used. In any of these cases specific connections between the accelerators and the selected mechanism may be created to perform the necessary communications.

In another aspect, a hardware acceleration processor for runtime task dependency management in a multi-core processor is proposed. The multi-core processor may comprise interconnected processor elements operating in slave mode. The hardware acceleration processor may comprise: data communication logic to communicate with the interconnected processing elements of the multi-core processor, a system memory, and other peripheral modules; control logic to modify operation of a gateway element, said gateway element providing new and finished tasks from a plurality of threads running in the processing elements of the multi-core processor; dedicated local memory to store data characterizing tasks and task dependencies managed by the hardware acceleration processor; and control logic to resolve deadlocks in multi-task parallel operation, said control logic enforcing task dependencies and retaining task data.

In another aspect, a computer program product is disclosed. The computer program product may comprise program instructions for causing a computing system to perform a method of managing task dependencies at runtime in a parallel computing system according to some examples disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

DETAILED DESCRIPTION

The word "exemplary" is used herein to mean "serving as an example, instance, or illustration". Any example described herein as "exemplary" is not necessarily to be construed as preferred or advantageous over other embodiments.

The acronym "OmpSs" is intended to mean "Task Based Programming Model OmpSs".

The acronym "TBB" is intended to mean "Thread Building Blocks".

The acronym "StarSs" is intended to mean "Task Based Programming Model StarSs".

The acronym "GW" is intended to mean "Gateway".

The acronym "TRS" is intended to mean "Task Reservation Station".

The acronym "DCT" is intended to mean "Dependence Chain Tracker".

The acronym "TM" is intended to mean "Task Memory".

The acronym "Task_ID" is intended to mean "Task Identification".

The acronym "VM" is intended to mean "Version Memory".

The acronym "DM" is intended to mean "Dependence Memory".

The acronym "ARB" is intended to mean "Arbiter".

The acronym "H/W" is intended to mean "Hardware".

The acronym "S/W" is intended to mean "Software".

The acronym "FIFO" is intended to mean "First In First Out".

The acronym "N #" is intended to mean "New Task Information #".

The acronym "F #" is intended to mean "Finished Task Information #".

The acronym "Picos++ _ID" is intended to mean "Entry in the Task Memory Unit".

The acronym "DMA" is intended to mean "Direct Memory Access".

The acronym "ID" is intended to mean "Identification".

The acronym "CPU" is intended to mean "Central Processing Unit".

As used herein and in the claims, the singular forms "a," and "the" include plural referents unless the context clearly dictates otherwise. Thus, for example, reference to "a processing core element" includes one or a plurality of such elements and equivalents thereof known to those skilled in computing, electronics and parallel processing.

As used herein and in the claims, the term "memory" has the meaning of any type of memory element that is implemented in any known technology and configuration unless explicitly stated otherwise.

The present invention treats the problem of hardware acceleration of task dependency management in parallel computing. In particular, it teaches solutions for hardware-based dependency management to support nested tasks, resolve system deadlocks as a result of memory full conditions in the dedicated hardware memory and synergetic operation of software runtime and hardware acceleration to solve otherwise unsolvable deadlocks when nested tasks are processed. It also introduces buffered asynchronous communication of larger data exchange, requiring less support from multi-core processor elements as opposed to standard access through the multi-core processor elements.

The invention can be implemented as a hardware acceleration processor in the same silicon die as the multi-core processor for achieving gains in performance, fabrication cost reduction and energy consumption saving during operation.

Figure 1:
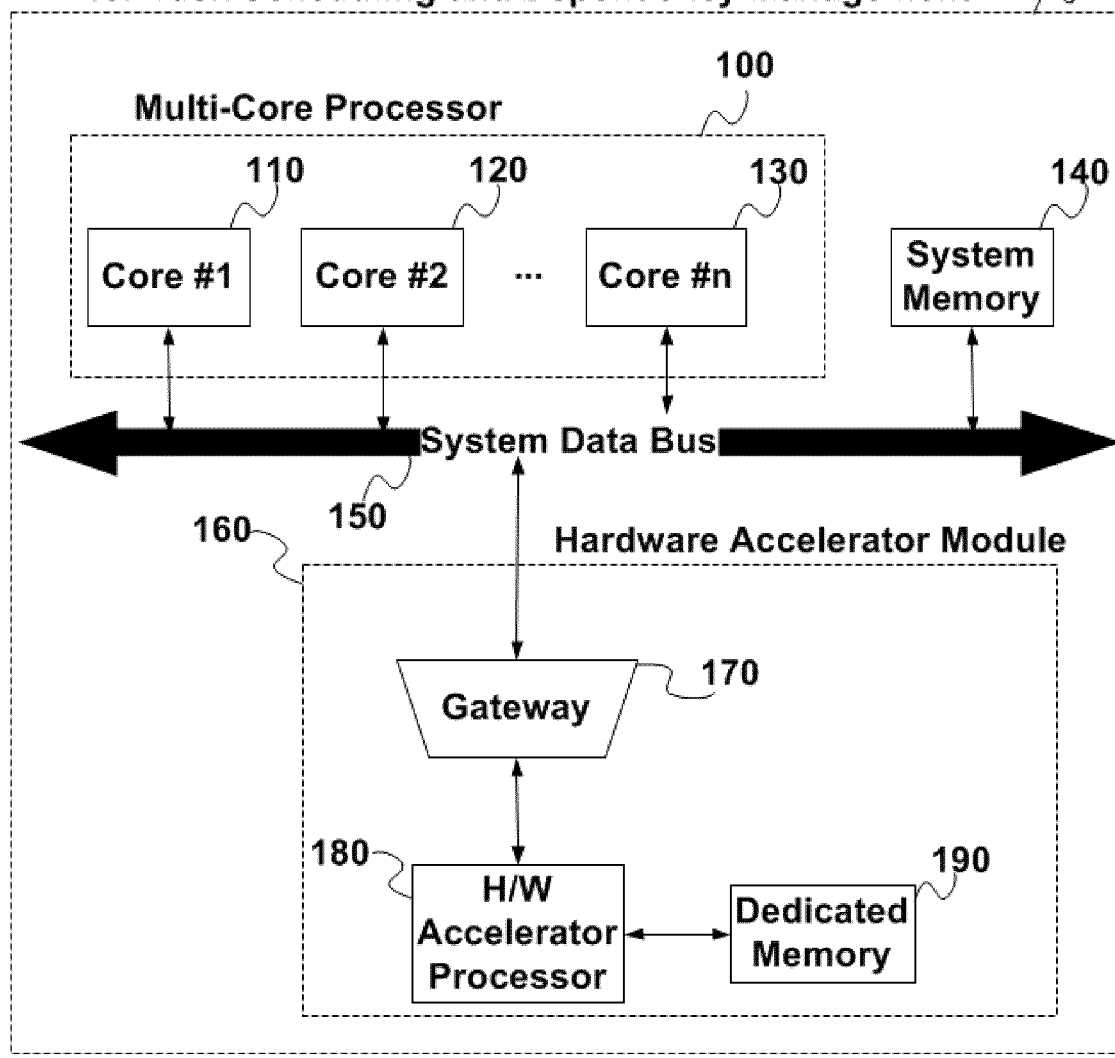
FIG. 1 shows a single-chip multi-core processor with hardware acceleration processor for task scheduling and dependency management.

FIG. 1 shows a single-chip multi-core processor with hardware acceleration processor for task scheduling and dependency management. The single-chip multi-core processor 10 may comprise a multi-core processor 100, system memory 140, system data bus 150 and hardware acceleration module 160.

The multi-core processor 100 may comprise at least two (maximum n) interconnected processing cores 110, 120, 130 with all the associated communication logic to access the system data bus 150 and communicate with system memory 140 and the hardware acceleration module 160. All multi-core elements are configured to operate in slave mode and are controlled by a hardware acceleration processor 180 in the hardware acceleration module 160. The system memory may comprise three buffers managed as circular FIFOs. Each buffer stores up to N units, where each unit represents one task, and where one or more tasks are created by the same thread they correspond to, and each thread executes into one of multi-core processing elements. In an alternative example of the present invention more than one thread are executed in each multi-core processing element. In yet another example, the multi-core processing element are of different types.

By means of example, each unit inside the new task buffer may comprise the following fields: Task_ID (8 bytes long), Number of Dependencies (4 bytes), $1^{st}$ Dependency Memory Address and Direction (12 bytes), . . . , for up to 15 dependencies, 192 bytes in total. As the number or dependencies is known at compile time, if a case with more dependencies arises, it is marked for sequential execution, therefore avoiding system deadlocks as a result of a memory full/cricial memory conflict state. Each ready task unit includes Task_ID, and Picos++ _ID (4 bytes). Each finished task is represented by the Picos++ _ID. Special values of Task_ID and Picos++ _ID fields in the new and finished task units are reserved in order to indicate a valid task, while a special value of the Picos++ _ID in the ready task unit is used to indicate empty space in this unit. Modifications of this example exist where a different size and type of buffers are used, and any number and length of fields are implanted together with other special values.

In an alternative example, the hardware acceleration processor 180 that communicates directly only with one of the multi-core processor elements 110, 120, 130, which multi-core processor element is configured to operate as a master of the remaining multi-core processor elements 110, 120, 130.

The hardware acceleration module 160 may comprise a gateway (GW) 170, the hardware acceleration processor 180, and a dedicated memory 190. The GW 170 fetches new and finished tasks from the multi-core processor elements 110, 120, 130 and dispatches them to the task reservation station (TRS) and the dependence chain tracker (DCT) both contained in the hardware acceleration processor 180.

The single-chip multi-core processor 10 may contain additional modules and elements which are not shown in FIG. 1. In addition, alternative examples may use a modified version of FIG. 1 without departing from the context of the invention.

Figure 2:
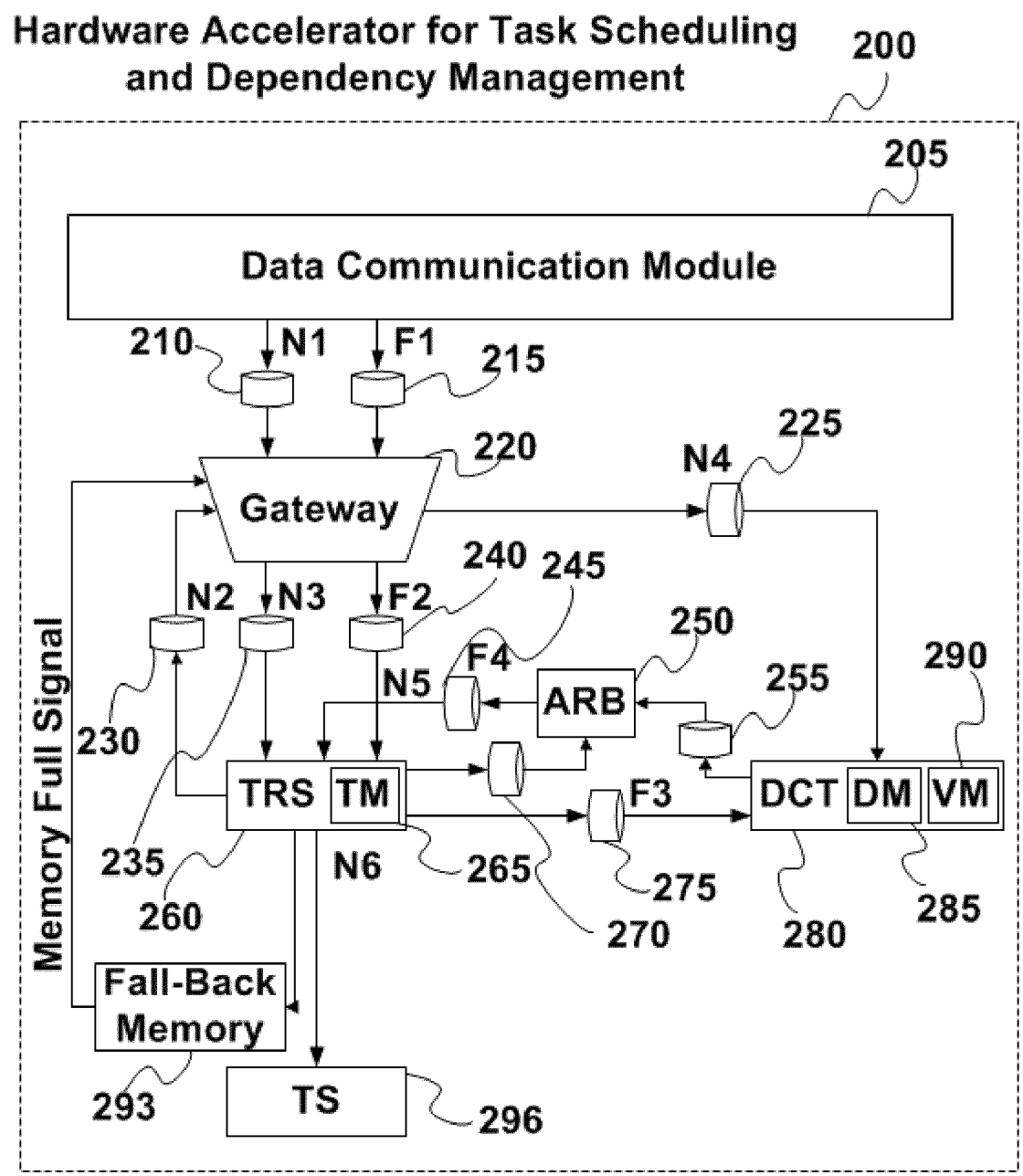
FIG. 2 shows the internal hardware architecture of a hardware acceleration processor for task scheduling and dependency management.

FIG. 2 shows the internal hardware architecture of a hardware Acceleration processor for task scheduling and dependency management. This processor 200 may comprise a data communication module 205 for accessing the data (and control bus, not shown in FIG. 1), gateway 220, TRS 260 with integrated dedicated local task memory (TM) 265, DCT 280 with integrated dedicated local dependence memory (DM) 285 and version memory (VM) 290, integrated dedicated local fall-back memory 293, arbiter (ARB) 250, task scheduler (TS) 296, and FIFO queues 210, 215, 225, 230, 235, 240, 245, 255, 270, 275.

The hardware acceleration processor 200 is used to accelerate task dependence graph management for task-based dataflow programming models, especially when they need to manage large numbers of fine grained task with complex patterns of dependencies. From the runtime software aspect the hardware acceleration processor 200 can be seen as a black box reading new tasks and dependencies from system memory at task creation time, writes ready-to-execute tasks in the system memory, and processes finished tasks.

The GW 220 fetches new and finished tasks from the multi-core processor elements 110, 120, 130 and dispatches them to the task reservation station (TRS) 260 and the dependence chain tracker (DCT) 280 both contained in the hardware acceleration processor 180. TRS 260 is the main task management unit and tracks the readiness of new tasks and manages the deletion of finished tasks. It includes a task memory (TM) 265. By means of example and without limiting the scope of the present invention, TM 265 has space for 256 entries, where each entry corresponds to 256 tasks. Each entry stores task identification (Task_ID), the number of dependencies per task (# Deps), the position in the DCT where each dependency is saved, and a reference to the next task consumer of this dependence.

The DCT 280 is the major dependence management unit. It manages task dependences through two integrated dedicated local memories, the DM 285 and the VM 290. The DM 285 stores the memory addresses of the dependencies as tags and performs address matching for each for each new dependency to those arrived earlier for tracking data dependences.

The VM 290 keeps the chain of task consumers and producers of all the references to the same dependency address (i.e. the "versions").

The ARB 250 works as a switch and multiplexes the FIFO queues 245, 255, 270, 275 between the TRS 260 and the DCT 280.

The TS 296 stores all ready (to execute) tasks and schedules them to idle workers. Each pair of components is connected with FIFO queues to enable asynchronous communication.

The fall-back memory 293 may be used only as a last reserve when the dedicated local dependence memory DM is full or gets into a critical memory conflict. In other examples, the fall-back memory 293 may be used as a last reserve when any of the dedicated local memories (TM, DM, VM) is full or gets into a critical memory conflict. Once used, a memory full signal is sent to the GW 220 causing it to stop receiving any new tasks until the signal is cleared after a mechanism for deadlock prevention has dealt with the management of nested tasks, as presented later.

FIG. 2 also shows the sequence of operational flow when processing new (labeled N #) and finished (labeled F #) tasks; (N1-N6 and F1-F4 in this example).

Figure 3A:
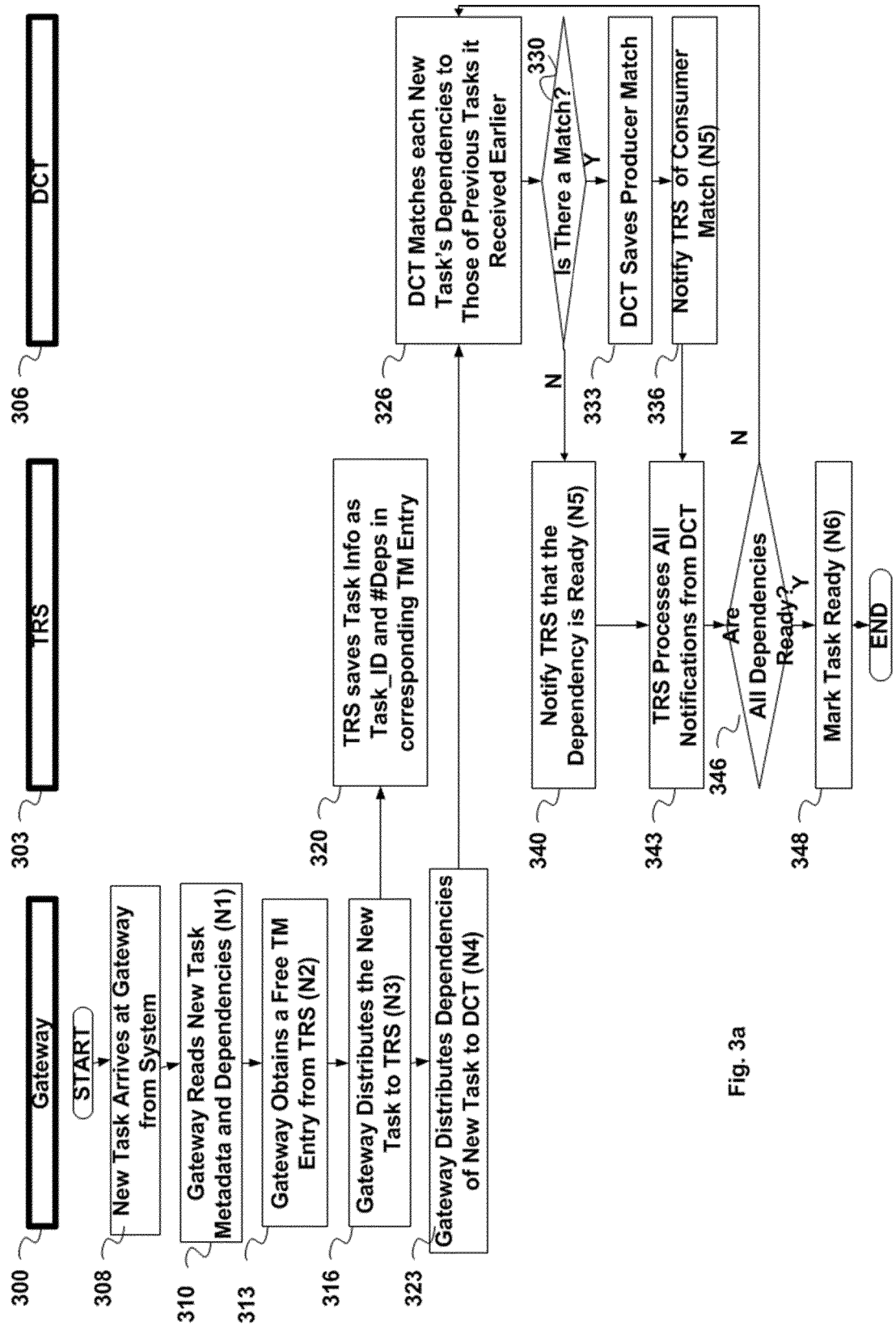
FIG. 3a shows a flowchart of the steps involved in handling a new task by the hardware Acceleration processor.

FIG. 3a shows a flowchart of the steps involved in handling a new task by the hardware acceleration processor. The method starts with a new task arriving 308 at the GW 300 from a multi-core processing element 110, 120, 130. The GW 300 reads new task metadata and dependencies (N1) 310, obtains a free TM entry from the TRS (N2) 313, distributes the new task 316 to the TRS 303 (N3), and the dependencies of the new task 323 to the DCT 306 (N4).

The TRS 303 saves task info as Task_ID and #Deps in corresponding TM 265 Entry. The DCT 306 matches each new task's dependencies to those of previous tasks it received earlier 326. If there is a match 330, the DCT 306 saves the task dependency match 333 and notifies the TRS 303 of the consumer/producer task dependency match 336 (N5) and if it is the case of the readiness of the dependency. If there is no match 330, the DCT 306 notifies the TRS 303 that the dependency is ready 340 (N5).

The TRS 303 processes all notifications it receives from the DCT 343. If one or more dependencies are not ready it leaves control to the DCT 306 to continue matching each new task's dependencies to those of previous tasks it received earlier 326. If all dependencies are ready 346, the TRS 303 marks the task as ready 348 (N6).

Figure 3B:
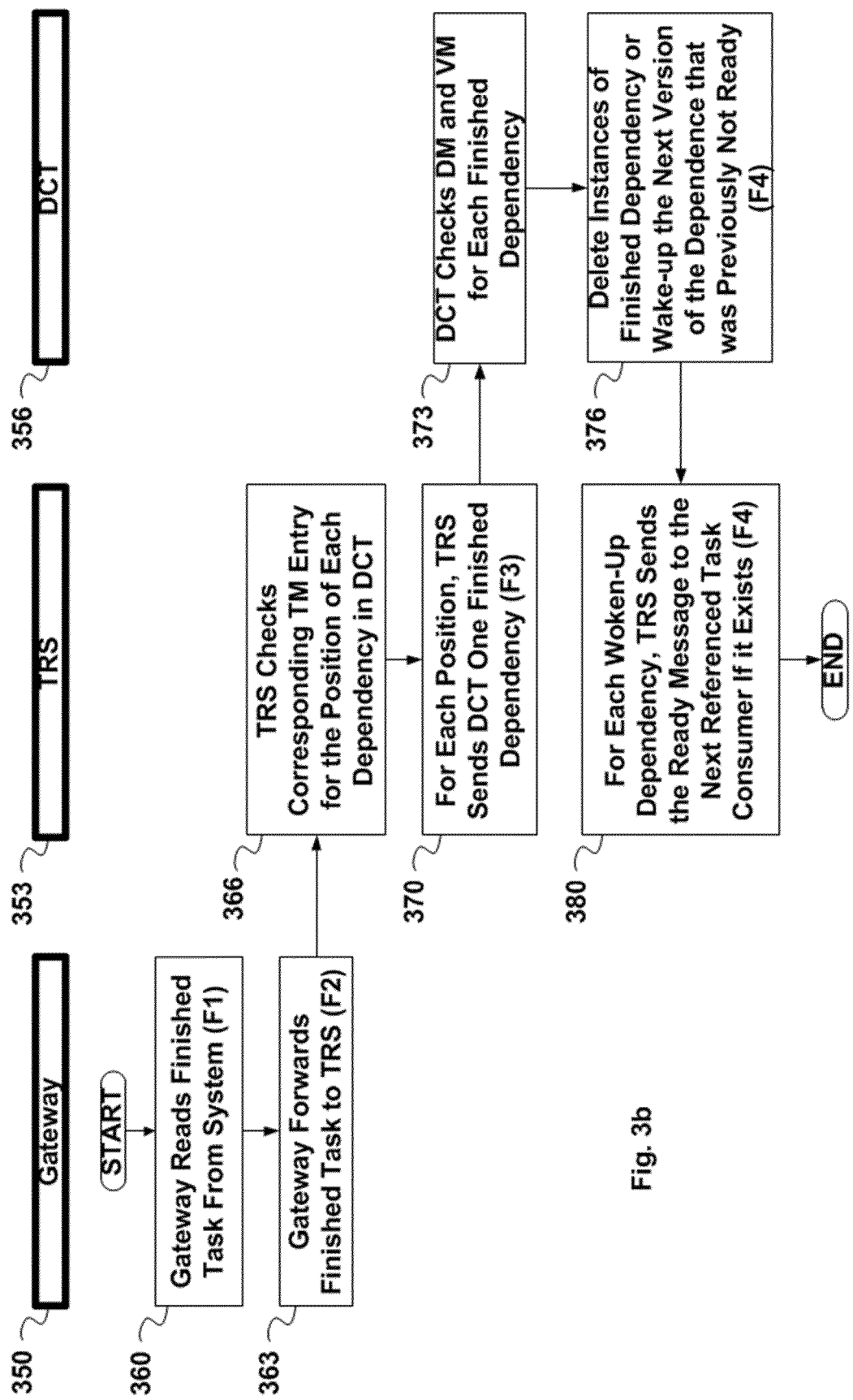
FIG. 3b shows a flowchart of the steps involved in handling a finished task by the hardware acceleration processor.

FIG. 3b shows a flowchart of the steps involved in handling a finished task by the hardware Acceleration processor.

The method starts with the GW 350 reading a finished task 360 from a multi-core processing element 110, 120, 130 (F1) and forwarding it to the TRS 363 (F2). The TRS 353 checks the corresponding TM 265 entry for the position of each dependency in the DCT 280. For each position, the TRS 353 sends to the DCT 280 one finished dependency 370 (F3).

The DCT 280 checks the DM 285 and the VM 290 for each finished dependency 373 and deletes all instances of the finished dependency or wakes up the next version of the dependency that was previously not ready 376 (F4).

The method ends with the TRS 353 sending the ready message to the next referenced task consumer, if it exists, and for each woken-up dependency 380 (F4).

Figure 4A:
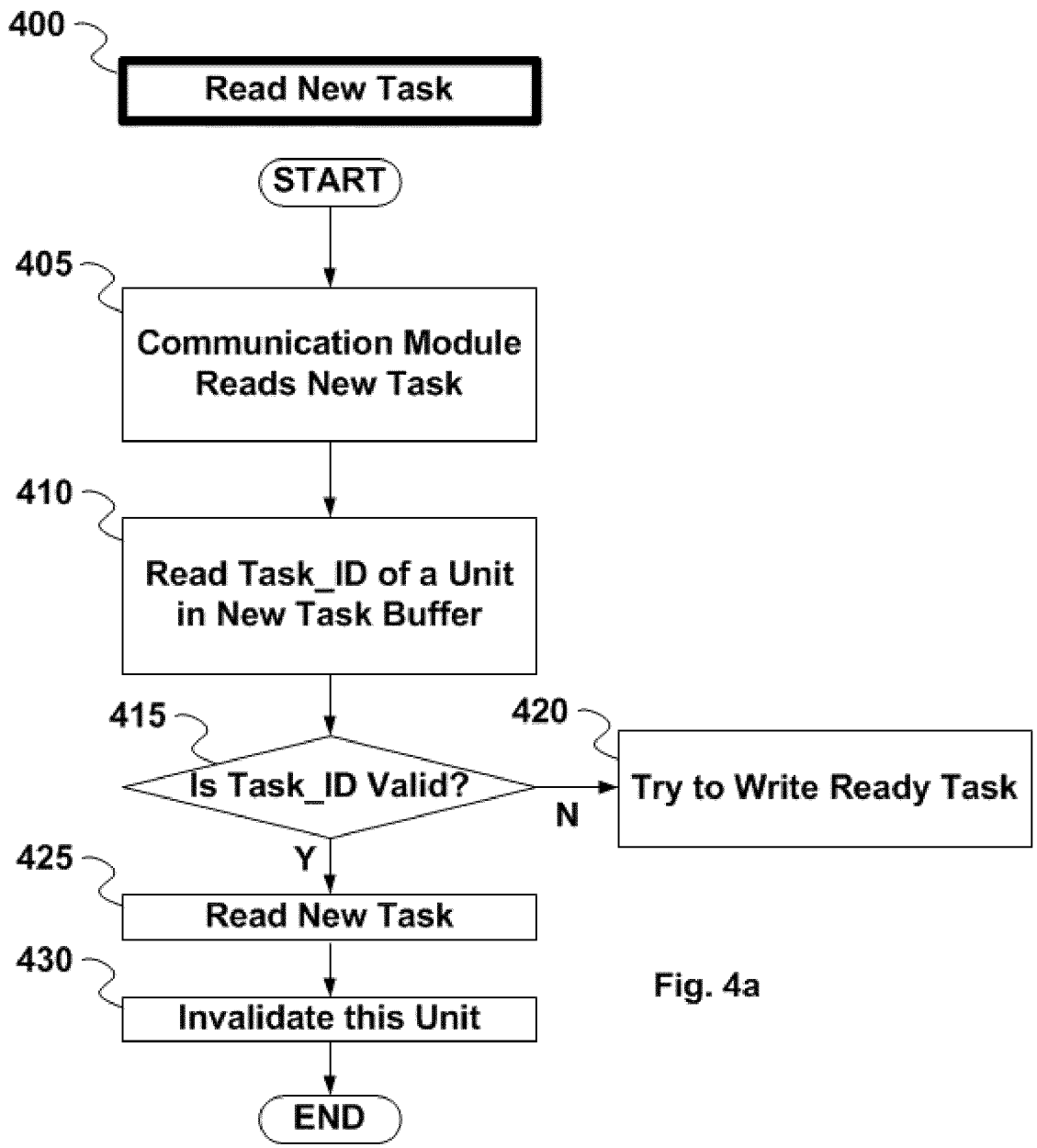
FIG. 4a shows a flowchart of the steps involved in reading a new task.
Figure 4B:
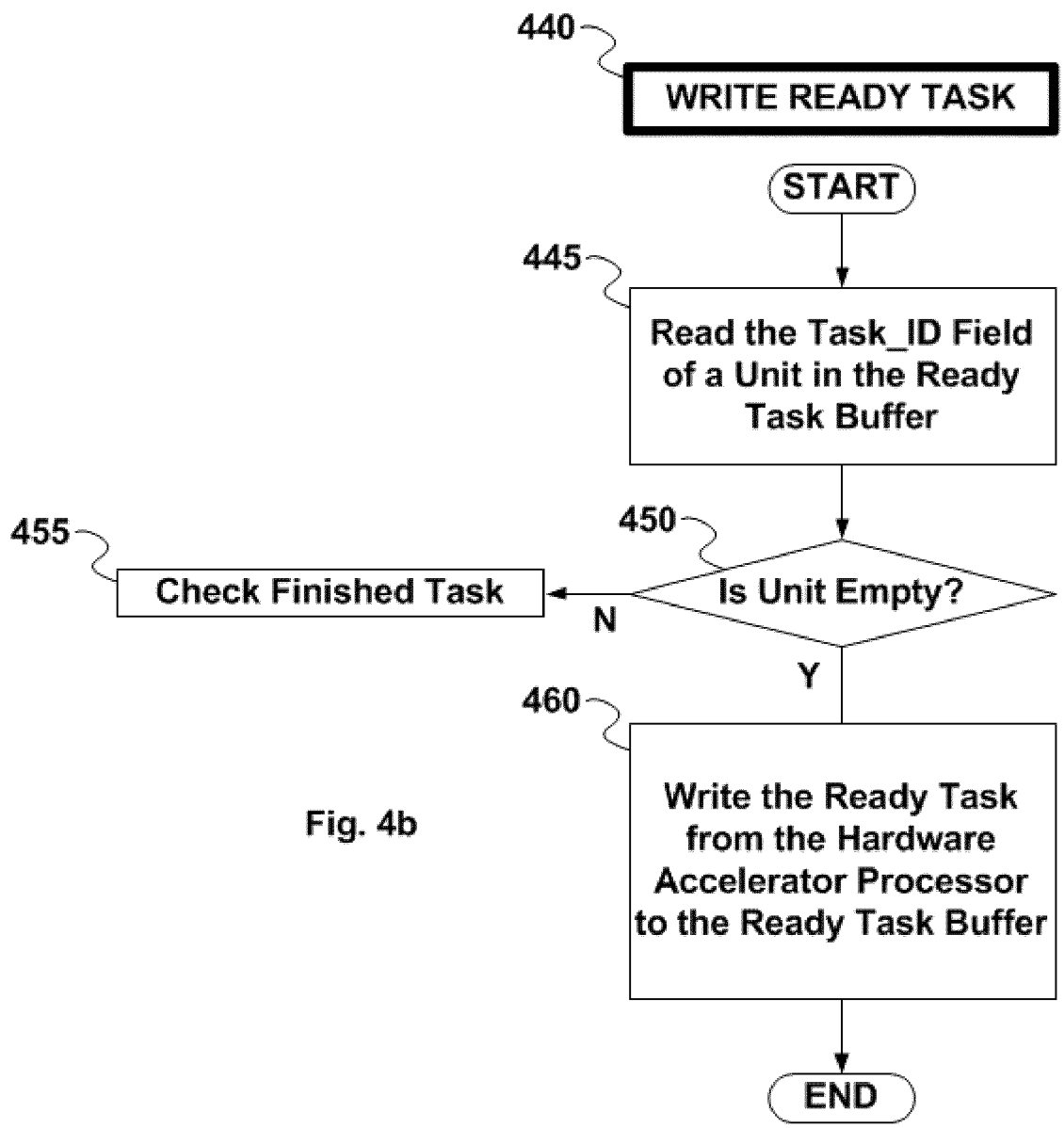
FIG. 4b shows a flowchart of the steps involved in writing a ready task.
Figure 4C:
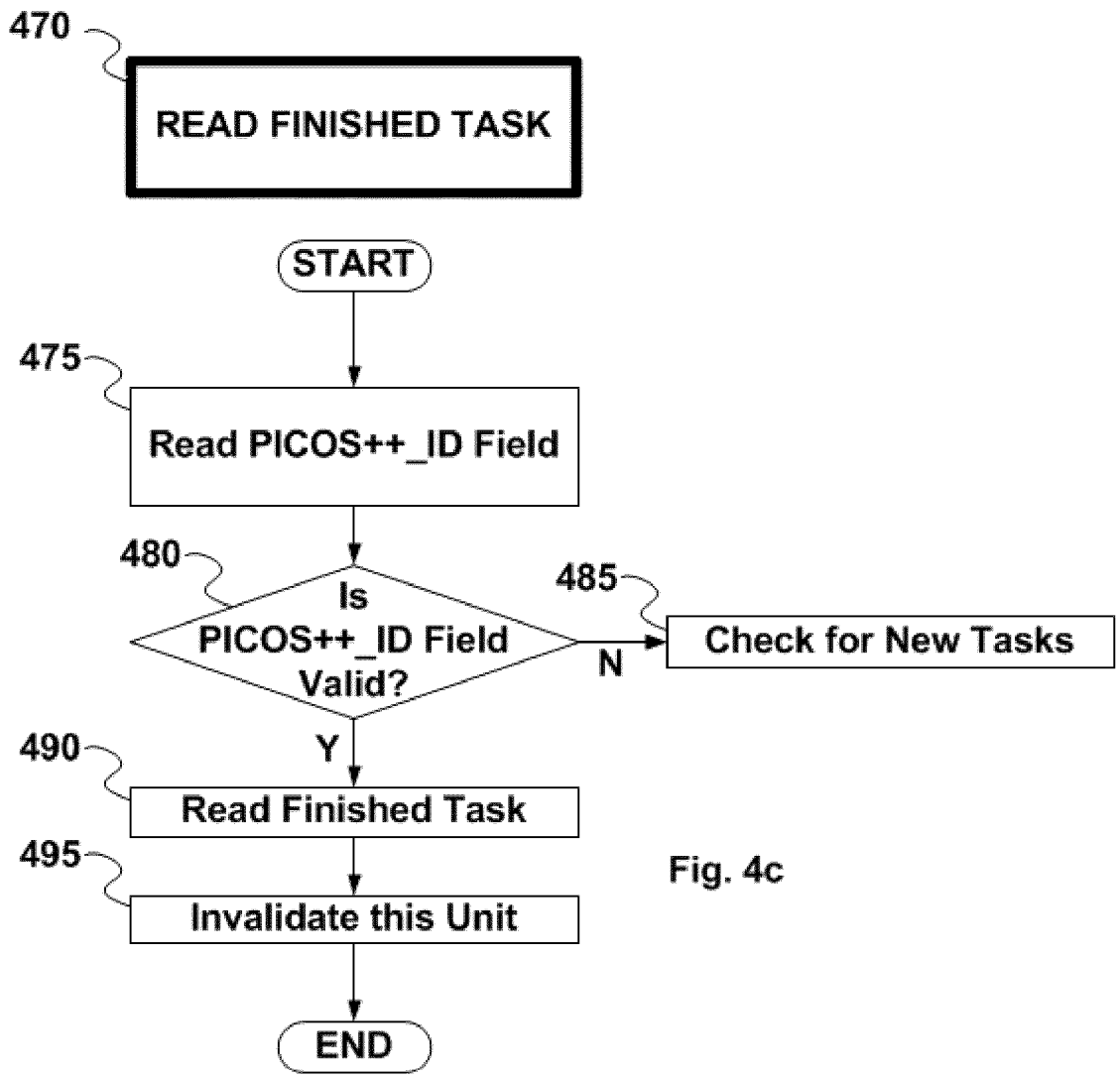
FIG. 4c shows a flowchart of the steps involved in reading a finished task.

FIG. 4a, FIG. 4b and FIG. 4c show the flowcharts of the hardware acceleration processor-general processor communication mechanisms. For these communications three buffers are required: new task buffer, ready task buffer and finished task buffer.

FIG. 4a shows a flowchart of the steps involved in reading a new task from the new task buffer, prior to the process described in FIG. 3a. The read new task method 400 starts with the communication module 205 reading a new task 405 and in particular the Task_ID flag of a unit/entry in the new task buffer 410. If the Task_ID flag is not valid 415 it tries to process write ready task 420 to the ready task buffer. If the Task_ID flag of the unit in the new task buffer is valid 415 it (the hardware acceleration processor) reads the new task info and invalidates this unit 425 in the new task buffer to allow future new tasks to be stored.

FIG. 4b shows a flowchart of the steps involved in writing a ready task into the ready task buffer. The write ready task method 440 starts with the communication module 205 reading the Task_ID flag of a unit/entry in the ready task buffer 445. If the unit is not empty 450 (Task_ID is valid indicating that this unit has valid data) it (the hardware acceleration processor) checks the finished task 455 buffer. If this unit in the ready task buffer is empty 450 and there is a ready task, it (the hardware acceleration processor) writes the ready task to this unit in the ready task buffer 460.

FIG. 4c shows a flowchart of the steps involved in reading a finished task from the finished task buffer. The read finished task method 470 starts with the communication module 205 reading Picos++ _ID field 475 from the finished task buffer unit/entry and if the field is not valid 480 it (the hardware acceleration processor) switches and checks for new tasks 485 in the new task buffer. If the field of the finished task buffer entry is valid 480, it (the hardware acceleration processor) read the finished task 490 and invalidates this unit 495.

The methods of FIG. 4a-c work without problem for simple tasks, i.e. not nested.

The current invention teaches improvements in performance by modifying the access of the hardware acceleration processor 160 to the system memory 140.

Figure 5:
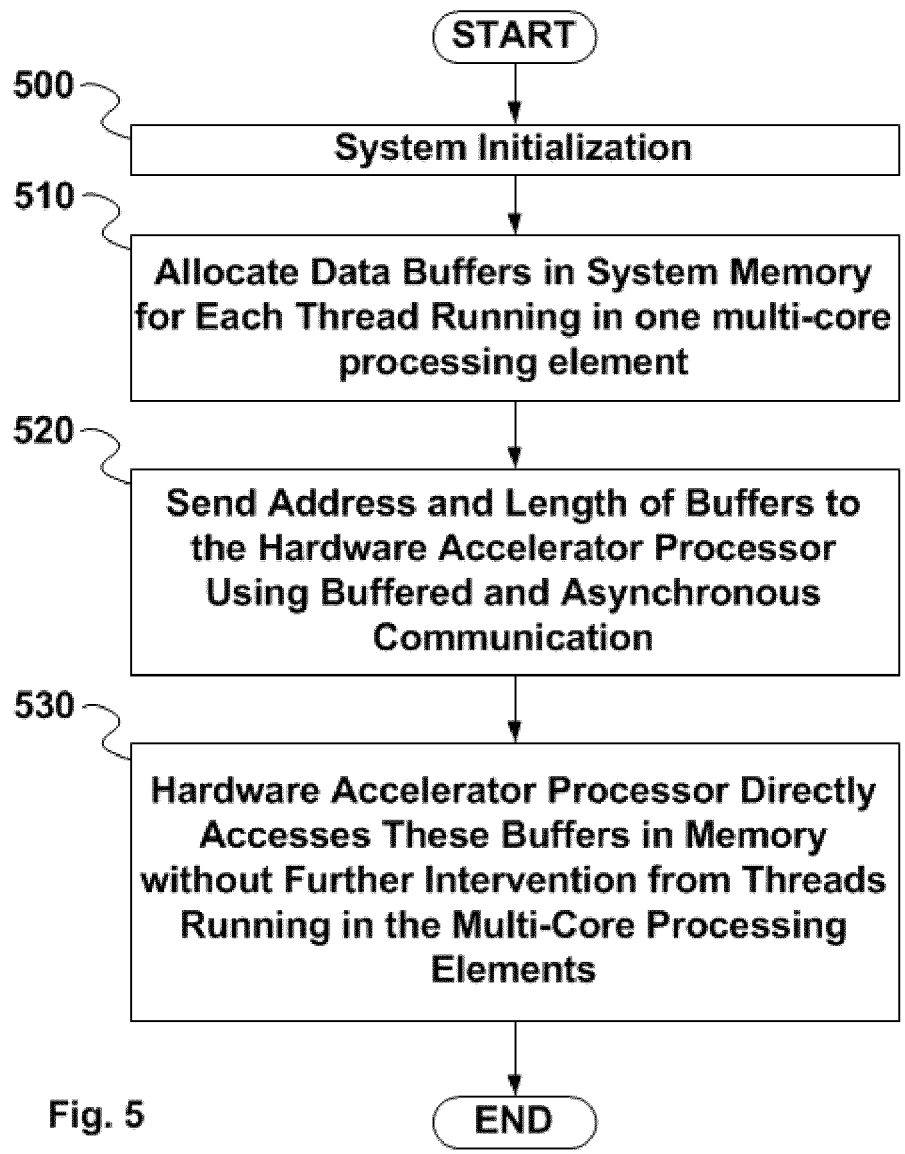
FIG. 5 shows the steps involved for the runtime software to engage the hardware acceleration processor to manage task dependencies.

FIG. 5 shows the steps involved for the runtime software to engage the hardware acceleration processor to manage task dependencies. The method starts with system initialization 500. The runtime software running at one of the multi-core processing elements 110, 120, 130 allocates data buffers 510 in the system memory 140 for each thread running at one multi-core processing element 110, 120, 130. It then sends address and length of buffers to the hardware acceleration processor 180 using buffered and asynchronous communication 520. The method ends with the hardware acceleration processor 180 directly accesses these buffers in system memory without further intervention from threads running in the multi-core processing elements 110, 120, 130.

In another example another field is added to the new task packet containing the parent_ID of the task and sent to the DCT. The receiving DCT differentiates dependencies using the parent_ID as an additional tag, which tag is used to enable to dependencies of non-sibling tasks to be maintained in separate task dependence graphs. There may arise situations where the hardware task managers receive a new task but they run out of hardware acceleration processor memory or get into memory conflicts. However, in the case of non-nested tasks, every task finishing execution frees memory for the next new task. Therefore, sooner or later, this new task will be able to get into the hardware acceleration processor.

However, for nested tasks with dependencies, there may be a situation where all dedicated memory of the hardware acceleration processor is taken by the available parent tasks and once the first child is read it has no memory to store its dependencies, resulting in a deadlock due to lack of memory.

To solve this problem a modified dataflow is used where once a task is read it is processed atomically, i.e. all its dependencies are processed as one. This design and dataflow means that the GW 220 is conscious of the free spaces in the dedicated memories before it reads a new task. For the case when the new task already has dependencies that already exist in the TM and VM memories, smooth operation is possible. However, for new dependencies, hashing is used, but may not be stored as the memory that should store it is full, regardless of the percentage of DM usage: critical memory conflict. This problem cannot be anticipated. It results in a simple slow-down of the processing of non-nested tasks but can cause a deadlock with nested tasks. To overcome this problem the new fall-back memory 293 is introduced and is used whenever a new dependency cannot be stored in DM. Once it is used it raises the memory full signal, which stops the GW from reading any new tasks while allowing it to continue processing the remaining dependencies of the current task.

If the child task is stored inside the new task buffer but cannot be read by the hardware, the system stalls. Due to the fact that the first child's dependencies are a subset of its parent's, the first task is always ready to execute; this is not the case for the other children tasks. Therefore, if the first child is still in the new task buffer it has to be processed for avoiding a potential deadlock. If the first child has been read by the hardware acceleration processor there is no risk of deadlock and the remaining children of the task must remain in the queue until the hardware processes them.

Figure 6A:
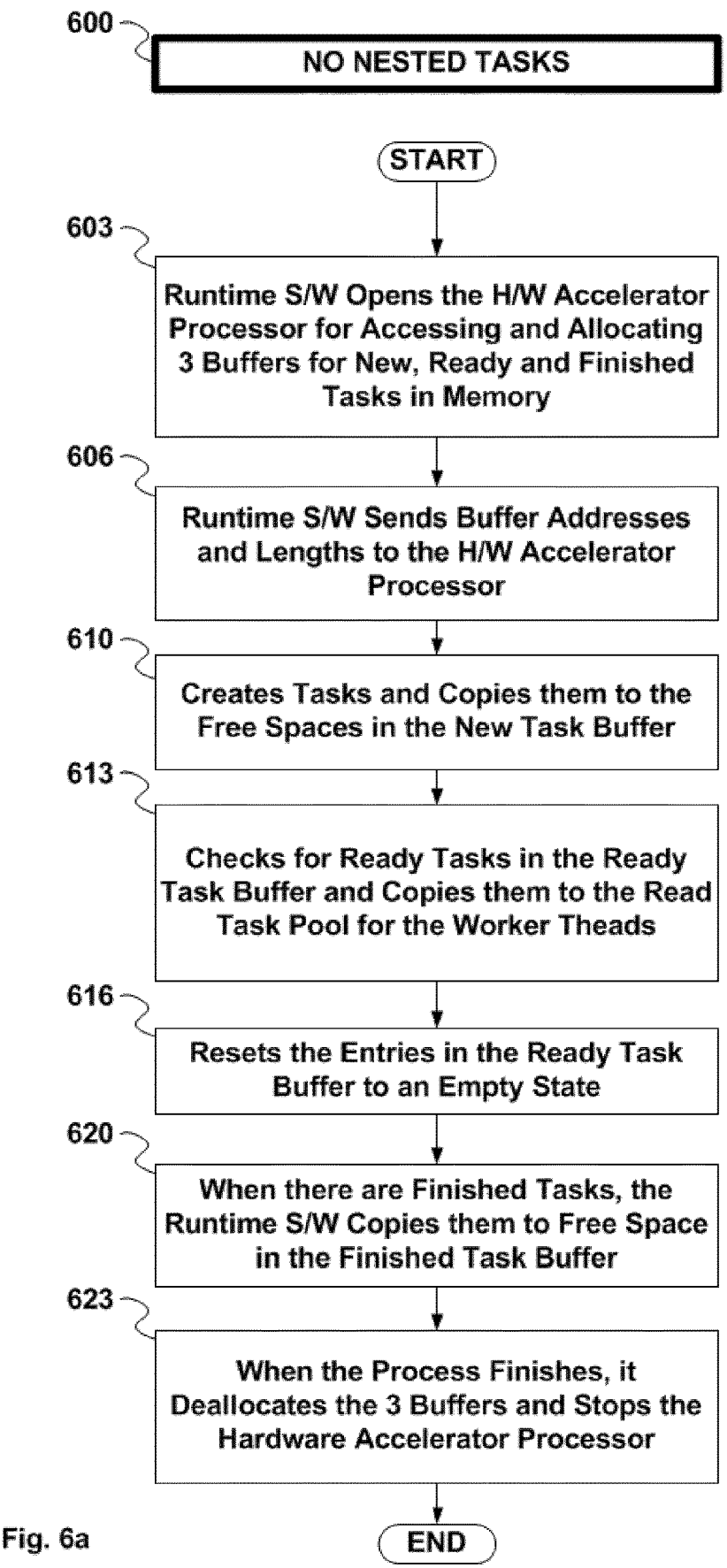
FIG. 6a shows a flowchart of the steps involved in dependency management of non-nested tasks.

FIG. 6a shows a flowchart of the steps involved in dependency management of non-nested tasks, starting from the initialization of the hardware acceleration processor, on the software runtime support running in the multi-core processor 100. The method 600 starts with the runtime software opening the hardware acceleration processor 180 for accessing and allocating 3 buffers for new, ready and finished tasks in memory 603, and then sending buffer addresses and lengths to the hardware acceleration processor 180.

The runtime software support running in the multi-core processor 100 then creates and copies the new task info to the free spaces in the new task buffer 610, checks for ready tasks in the ready task buffer and copies them in the ready task pool for the worker threads 613. The runtime software then resets the entries in the ready task buffer to an empty state 616. When there are finished tasks, the runtime software copies them to the free space in the finished task buffer 620, and when the processing finishes, it de-allocates the three buffers and stops 623 the hardware acceleration processor 180.

Figure 6B:
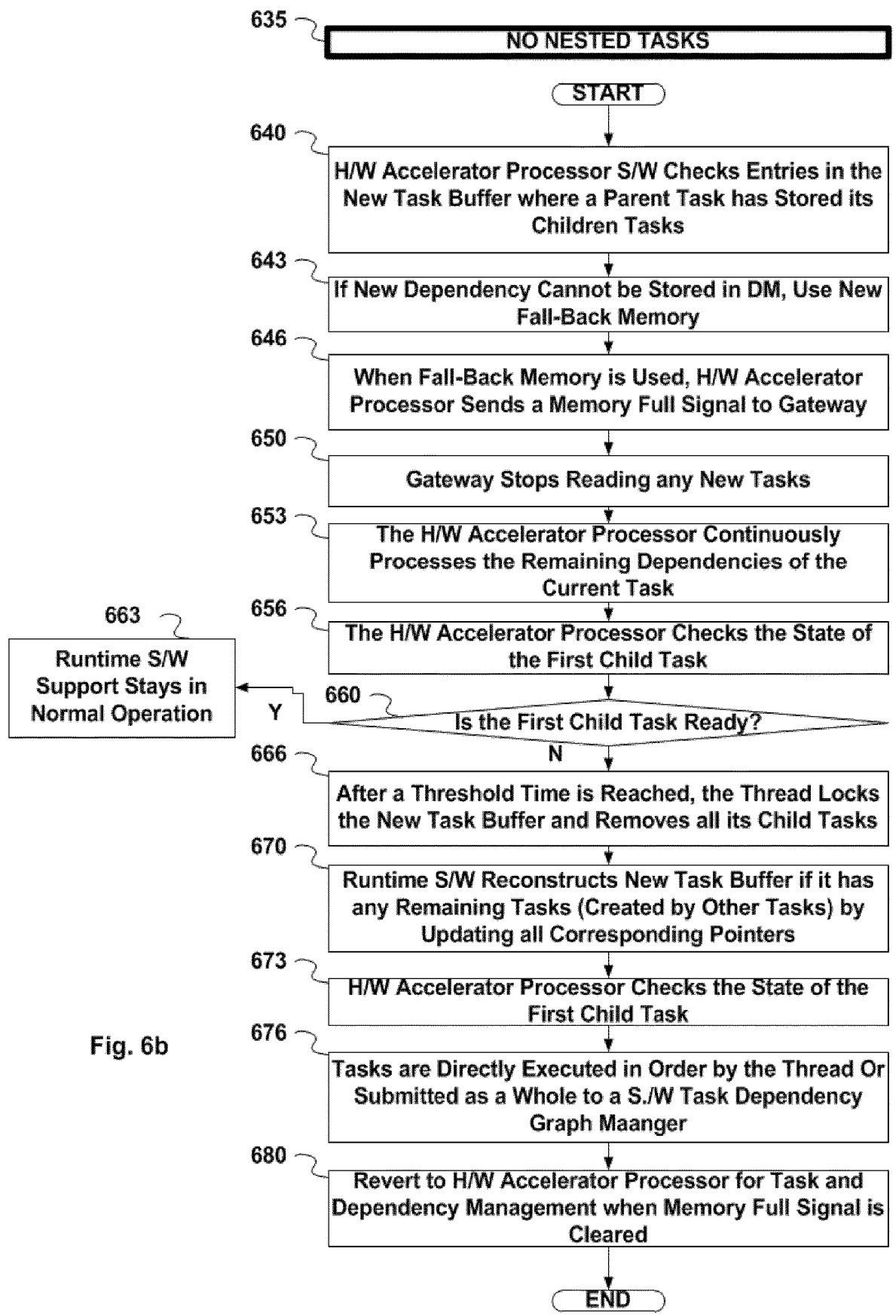
FIG. 6b shows a flowchart of the steps involved in dependency management of nested tasks.

FIG. 6b shows a flowchart of the steps involved in dependency management of non-nested tasks. The method 635 starts with the hardware acceleration processor 180 checking entries in the in the new task buffer where a parent task has stored children tasks 640. If new dependencies cannot be stored in the DM 285 it uses 643 the fall-back memory 293, which once used, the hardware acceleration processor 180 sends a memory full signal to the 646 GW 220. Upon reception of the signal, the GW 220 stops reading any new tasks 650. The hardware acceleration processor 180 then continuously processes the remaining dependencies of the current task 653. If the first child task is ready 660 the runtime software support stays in normal operation 663, else after a threshold time is reached or the deadlock status of the new task buffer is checked the thread locks the new task buffer and removes all its child tasks 666. The runtime software then reconstructs the new task buffer if it has any remaining tasks that have been created by other tasks by updating all corresponding pointers 670. Tasks are then directly executed in order by their corresponding thread or are submitted as a whole to a software task dependency graph manager 676. The method 635 then finishes with the runtime software reverting task and dependency management to the hardware acceleration processor 180 when the memory full signal is cleared.

When the system comprises a set of processors and a set of accelerators, submitting tasks in order directly to the accelerators may be troublesome. When the gateway module is stopped due to a full signal, a system where the accelerators are directly connected to the hardware task dependency manager may deadlock as there may be no available connection to the accelerators. To solve this issue, different methods may be used. For example, if the accelerators are connected only to the hardware task manager, it may include a bypass to directly submit ready tasks to the accelerators even when the system is full. Alternatively or additionally, a simple accelerator hardware manager working in parallel with the hardware task manager may be implemented and used as a bypass. Even a software accelerator manager configured to send tasks directly to the accelerators may be used. In any of these cases specific connections between the accelerators and the selected mechanism may be created to perform the necessary communications.

The above example descriptions are simplified and do not include hardware and software elements that are used in the examples but are not part of the current invention, are not needed for the understanding of the examples, and are obvious to any user of ordinary skill in related art. Furthermore, variations of the described method, system architecture, and software architecture are possible, where, for instance, method steps, and hardware and software elements may be rearranged, omitted, or new added.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

Further, although the examples described with reference to the drawings comprise computing apparatus/systems and processes performed in computing apparatus/systems, the invention also extends to computer programs, particularly computer programs on or in a carrier, adapted for putting the system into practice.

The invention claimed is:

1. A method of managing task dependencies at runtime in a parallel computing system of a hardware processing system, said parallel computing system comprising a multi-core processor running runtime software, a hardware acceleration processor, a communication module, and a gateway, the method comprising:
    initializing the parallel computing system;
    allocating data buffers in system memory for each thread running in each multi-core processing element;
    sending system memory address and length of buffers used in a communication to the hardware acceleration processor using buffered and asynchronous communication;
    the hardware acceleration processor directly accessing the buffers bypassing the threads running in the multi-core processing elements, the multi-core processing elements being parallel to one another;
    the hardware acceleration processor reading a new task buffer comprising information of a newtask and upon sensing a memory full condition or a memory conflict in a dedicated local memory attached to the hardware acceleration processor, instructing the gateway to stop receiving new tasks;
    the hardware acceleration processor processing a last read task and dependencies of the last read task; and
    having finished processing the last read task and the dependencies of the last read task, memory space of the hardware acceleration processor is freed and processing continues with a next task, and
    where the tasks are nested tasks, and where at least one of the newtasks or the last read task is a first child task, the method further comprising:
    if the first child task has been processed, the runtime software allowing the hardware acceleration processor to continue processing tasks;
    if the first child task has not been processed, waiting until a threshold time is reached or checking the new task buffer status before instructing the thread to lock the new task buffer and remove child tasks from the buffer, including at least the first child task;
    the runtime software reconstructing the new task buffer by updating all corresponding pointers if the new task buffer has any remaining tasks that have been created by other tasks;
    the thread executing tasks in order or submitting them as a whole with their child dependencies to a software task dependency graph manager; and
    the runtime software reverting to the hardware acceleration processor for task and dependency management when the memory full or the memory conflict signal is cleared.

2. The method according to claim 1, wherein the hardware acceleration processor comprises a dedicated local memory for storing task dependencies, a dedicated local memory for storing task producer and creator threads, and a dedicated local memory for storing task identification (ID) and number of dependencies, and a memory for using once at least one of the dedicated local memories becomes full or gets into memory conflicts, the method further comprising using a memory full signal to alter execution of the flow of tasks until memory space of the hardware acceleration processor is freed.

3. The method according to claim 1, where one of the multi-core processing elements is a master and the other multi-core processing elements are slaves and where said master communicates with the hardware acceleration processor instead of with each slave.

4. The method according to claim 1, further comprising:
    receiving at the gateway, metadata and dependencies of the newtask, said task having been sent from a thread controlled by the runtime software running at the interconnected multi-core processor;
    informing the gateway of free memory space in a dedicated local task memory in the hardware acceleration processor;
    the gateway distributing the new task to an internal task reservation module and to an internal dependence chain tracker module, each being a part of the hardware acceleration processor;
    the hardware acceleration processor keeping track of task processing in the multi-core processors, task dependencies, dedicated local memory and free memory space of the hardware acceleration processor.

5. A hardware acceleration processor for runtime task dependency management in a multi-core processor, said multi-core processor comprising interconnected processing elements, where one of the multi-core processing elements is a master and the other multi-core processing elements are slaves, and said hardware acceleration processor comprising:
  data communication logic to communicate with the master interconnected processing elements of the multi-core processor instead of with each one of the slave interconnected processing elements, a system memory, and other peripheral modules;
  a gateway element reading new and finished tasks from a plurality of threads running in the processing elements of the multi-core processor through communications buffers and providing the information to internal components of the hardware acceleration processor;
  dedicated local memory to store data characterizing tasks and task dependencies managed by the hardware acceleration processor;
  the control logic to resolve deadlocks in multi-task parallel operation, said control logic enforcing task dependencies and retaining task data, and
  where the control logic for resolving deadlocks in multi-task parallel operation is in communication with runtime software running at the multi-core processor, said processor further comprising logic:
  when a memory full condition arises in the dedicated local memory of the hardware acceleration processor, the runtime software to check that the first child task has been successfully read by said processor, and to allow default operation with hardware runtime task dependency management, or if the first child task has not been read successfully and after a time threshold has been reached or the memory full condition has been checked in the new task buffer, the runtime software to allow the threads to lock the new task buffer, remove all its children, reconstruct the buffer by updating corresponding pointers if the new task buffer has any remaining tasks that have been created by other running tasks, and either execute child tasks in order by a thread without allowing them to create other tasks or submit them as a whole to a software task dependency graph manager, which maintains graphs of tasks with dependencies in separate task dependence graphs and schedules when the tasks are executed;
  when the memory full condition in the dedicated local memory of the hardware acceleration processor is cleared, the runtime software reverts to the hardware acceleration processor for dependency management.

6. The hardware acceleration processor according to claim 5, where said processor is implemented in programmable logic and is configured to handle dependencies from nested tasks.

7. The hardware acceleration processor according to claim 5, where the control logic for resolving deadlocks further comprises:
  first logic to treat tasks as a single event where parent tasks and their children tasks are managed together before processing other nested tasks;
  second logic to inform the gateway of free memory spaces in all dedicated local memory elements of said processor, where the gateway stops reading tasks if there are no sufficient spaces in said memory elements.

8. The hardware acceleration processor according to claim 6, where during the initialization stage of the multi-core processing elements, the threads running in said processing elements allocate data buffers in the system memory and send the addresses and lengths of said buffers to the hardware acceleration processor, the hardware acceleration processor further comprising:
  third logic to directly communicating said data buffers in system memory bypassing the multi-core processing elements;
  using buffers and asynchronous communication protocols.

9. The hardware acceleration processor according to claim 6, where said processor, dedicated local memory, gateway and multi-core processor elements are all in the same silicon die.

10. The hardware acceleration processor according to claim 6, said processor further comprising logic to:
  switch on in response to receiving a signal from the multi-core processor;
  after the runtime software has successfully allocated three buffers for new tasks, ready for execution tasks, and finished tasks in the system memory, send the buffer addresses and lengths to the hardware acceleration processor;
  whereby, after the runtime software has finished processing, where processing comprises creating new tasks, copying them to the free spaces in the new task buffer, checking for ready tasks in the ready task buffer, copying the ready tasks to the ready task pool for worker threads, resetting the entries in the ready task buffer to an empty state, copying finished tasks to the free space in the finished task buffer, and de-allocating buffers, the hardware acceleration processor switches off following receiving instructions from the runtime software.

11. The hardware acceleration processor according to claim 5, wherein the hardware acceleration processor comprises:
  a set of processors and a set of accelerators;
  bypass logic to directly submit ready tasks to the set of accelerators.

12. A non-transitory computer program product that causes a hardware acceleration processor to perform hardware-based runtime task dependency management in a multi-core processor interconnected with the hardware acceleration processor, the non-transitory computer program product having instructions to:
  receive at a gateway, metadata and dependencies of a new task, said task having been sent from a thread controlled by runtime software running at the interconnected multi-core processor;
  cause the gateway to sense free memory space in a dedicated local task memory in the hardware acceleration processor;
  cause the gateway to distribute the new task to an internal task reservation module and to an internal dependence chain tracker module in the hardware acceleration processor;
  cause the hardware acceleration processor to keep track of task processing in the multi-core processors, task dependencies, dedicated local memory and free memory space of the hardware acceleration processor;
  cause the hardware acceleration processor to detect an internal dedicated memory full condition, and to instruct the gateway to stop receiving any new tasks from runtime software controlling runtime of the multi-core processors;
  resolve the memory full condition and any deadlocks created by the memory full condition, using a memory flush and a reconstruction operation of tasks with dependencies while not allowing processed task to create other tasks;

execute software to select software dependency management depending on detection of the memory full condition and any deadlocks this the memory full condition creates; and execute software to use hardware dependency management after the runtime software detects memory full condition is over, and where the tasks are nested tasks, and where at least one of the newtasks or the last read task is a first child task, further comprising:

if the first child task has been processed, the runtime software allowing the hardware acceleration processor to continue processing tasks;

if the first child task has not been processed, waiting until a threshold time is reached or checking the new task buffer status before instructing the thread to lock the newtask buffer and remove child tasks, including at least the first child task;

the runtime software reconstructing the new task buffer by updating all corresponding pointers if the new task buffer has any remaining tasks that have been created by other tasks;

the thread executing tasks in order or submitting them as a whole with their child dependencies to a software task dependency graph manager; and the runtime software reverting to the hardware acceleration processor for task and dependency management when the memory full or the memory conflict signal is cleared.

13. A non-transitory computer program product that causes a hardware acceleration processor to perform hardware-based runtime task dependency management in a multi-core processor interconnected with the hardware acceleration processor, the non-transitory computer program product having instructions to:

receive at a gateway, metadata and dependencies of a new task, said task having been sent from a thread controlled by runtime software running at the interconnected multi-core processor;

cause a gateway to sense free memory space in a dedicated local task memory in the hardware acceleration processor;

cause the gateway to distribute the new task to an internal task reservation module and to an internal dependence chain tracker module in the hardware acceleration processor;

cause the hardware acceleration processor to keep track of task processing in the multi-core processors, task dependencies, dedicated local memory and free memory space of the hardware acceleration processor;

cause the hardware acceleration processor to detect an internal dedicated memory full condition, and to instruct the gateway to stop receiving any new tasks from runtime software controlling runtime of the multi-core processors;

resolve the memory full condition and any deadlocks created by the memory full condition, using a memory flush and a reconstruction operation of tasks with dependencies while not allowing processed task to create other tasks;

execute software to select between hardware or software dependency management depending on detection of the memory full condition and any deadlocks this the memory full condition creates; and execute software to use hardware dependency management after the runtime software detects memory full condition is over, and where the control logic for resolving deadlocks in multi-task parallel operation is in communication with runtime software running at the multi-core processor, said processor further comprising logic:

when a memory full condition arises in the dedicated local memory of the hardware acceleration processor, the runtime software to check that the first child task has been successfully read by said processor, and to allow default operation with hardware runtime task dependency management, or if the first child task has not been read successfully and after a time threshold has been reached or the memory full condition has been checked in the new task buffer, the runtime software to allow the threads to lock the new task buffer, remove all its children, reconstruct the buffer by updating corresponding pointers if it-the new task buffer has any remaining tasks that have been created by other running tasks, and either execute child tasks in order by a thread without allowing them to create other tasks or submit them as a whole to a software task dependency graph manager, which maintains graphs of tasks with dependencies in separate task dependence graphs and schedules when the tasks are executed;

when the memory full condition in the dedicated local memory of the hardware acceleration processor is cleared, the runtime software reverts to the hardware acceleration processor for dependency management.

* * * * *